Nov. 8, 1932.  J. HIGGINS ET AL  1,886,677
VALVE STRUCTURE
Filed Jan. 27, 1930
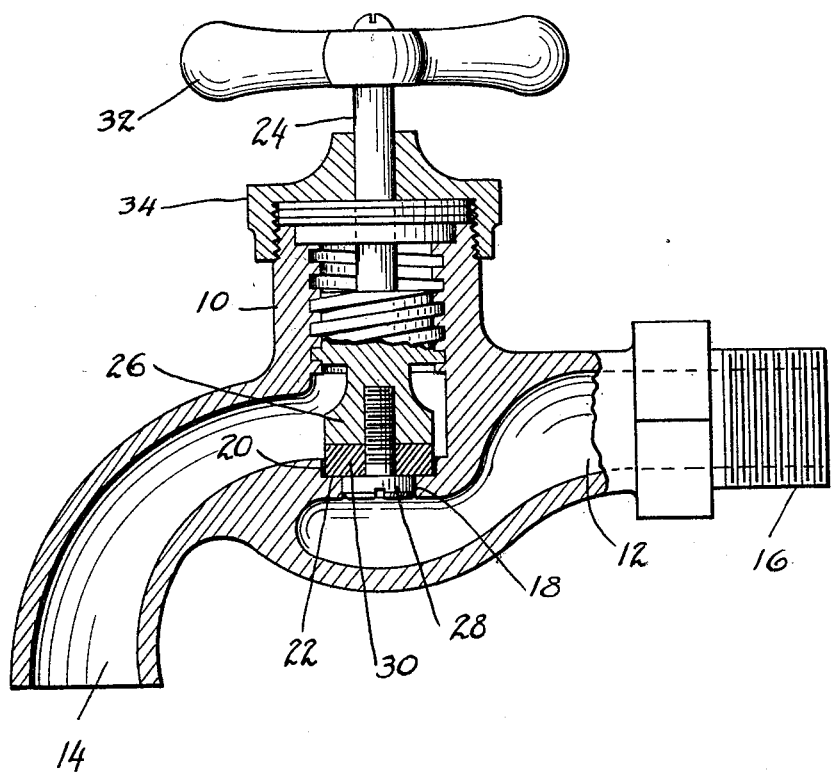
INVENTORS
James Higgins and
John L. Schultz
BY
Parker & Burton
ATTORNEYS Patented Nov. 8, 1932

1,886,677

UNITED STATES PATENT OFFICE

JAMES HIGGINS AND JOHN L. SCHULTZ, OF JACKSON, MICHIGAN

VALVE STRUCTURE

Application filed January 27, 1930. Serial No. 423,672.

Our invention relates to valve mechanism for controlling the flow of fluid, and has particular reference to that type of valve adapted for use in a faucet.

An object of our invention is to eliminate the necessity of the valve seat having to withstand substantially the entire pressure of the water system which supplies the faucet. In the conventional valve structure found in water faucets there is a passage which connects the inlet passage of the faucet with the outlet passage, or spigot. This connecting passage is usually a circular aperture and the valve is movable axially to seat around the upper periphery, or seat portion, of the valve opening. It is customary to secure a washer of leather, rubber, or some other resilient cushioning material to the extremity of the valve for the purpose of seating on the valve opening. The full water pressure presses around the edges of the seat and it is essential that the valve be tightly closed to exert a substantial pressure through the cushion washer on the seat in order to prevent leakage through the passageway.

By providing a "stepped" valve aperture and a corresponding reversely stepped valve to seat therein we have prevented the entire pressure of the water supply exerting a thrust about the valve seat and thereby causing leakage. By providing a cylindrical aperture, having side walls of substantial thickness, directly below the seat of the valve, and securing to the seating extremity of the valve a projection which entirely fills this cylindrical aperture, the pressure against the valve seat itself is practically eliminated.

Still another object of our invention is to so adapt the principle involved that it may be readily applied to the conventional faucet valve structure with a minimum of expense and labor.

A further object is to so assemble the valve structure that the projection which is used to remove the pressure from the valve seat may be secured to the ordinary valve as an improvement, without necessitating the installment of an entire new faucet.

Still further objects and meritorious features of our invention will become apparent from the following drawing wherein:

The figure is a sectional elevation showing our novel valve.

The numeral 10 represents the body of the valve which contains an inlet passage 12 and an outlet passage 14. The outlet passage is ordinarily termed the spigot. The faucet 10 is secured to the waterline by the customary threaded pipe connection indicated at 16.

Connecting the inlet passage and the outlet passage is a "stepped" opening comprising an aperture 18 which opens into the inlet passage 12 and a larger aperture 20 opening into the outlet passage 14. These apertures form a continuous passage and are in axial alignment with one another. The aperture 18 is of substantial depth, the walls of which form a ledge 22 upon which our valve unit is adapted to seat.

Threaded into the body of the faucet is the valve stem 24, the lower extremity of which, 26, constitutes the valve itself. Secured to the lower extremity of the valve by means of the screw 28 is a packing washer 30.

As the valve is forced downward on rotation of the handle 32, the packing washer 30 is forced to seat upon the ledge, or seat, 22 of the opening connecting the outlet and inlet passages. The head of the screw 28 is of a diameter and thickness just sufficient to completely fill the cylindrical aperture 18 when the packing washer 30 is seated upon the ledge 22.

In this way, the pressure in the water supply line is entirely taken up before reaching washer 30 by virtue of the fact that the head of screw 28 completely closes the opening 18 connecting the inlet passage 12 with the outlet passage 14.

The top of the faucet is closed by means of the cap ring 34 which is threaded thereon as indicated in the drawing, an aperture being provided therein through which the valve stem 24 may slide as it is rotated.

Inasmuch as practically no pressure reaches the valve seat of the assembly, where the packing washer 30 rests upon the ledge 22, there is no necessity of grinding this seat portion of the valve opening to enable the valve, when seated, to completely close the passage and prevent leakage. Not only is there no necessity for grinding the valve seat, as is customarily the practice, but the efficient life of the valve is greatly increased due to the fact that constant pressure at the valve seat is substantially eliminated.

The simplicity of our structure will be obvious to those skilled in the art, and its adaptability for substitution in the conventional faucet valve structure renders it very desirable. In a large number of the conventional faucet valve structures now on the market, the packing washer 30 is secured to the seat extremity of the valve by means of a screw, but the head of the screw is not designed in conjunction with such a passageway as is indicated at 18 in Fig. 1 for the purpose described. It is therefore obvious that it is only necessary to substitute our novel and peculiarly adapted screw for that already utilized in order to greatly increase the efficiency of operation and long life of the faucet.

Various modifications of our device will be apparent to those skilled in the art and for that reason we intend to limit ourselves only within the scope of the appended claim. Of course, it is obvious that whether our improved valve structure is utilized in conjunction with gaseous or liquid fluid is immaterial. The principle of operation is precisely the same and the valve is equally efficient with either type of fluid.

Furthermore, it will be apparent that it is immaterial whether the nut 28 functions to secure a separate and independent packing washer 30 to the seating extremity of the valve 26, or whether the nut and packing washer are constructed as an integral unit. It may be advantageous to form the valve 26 and packing washer material as a unit.

In fact, we contemplate as within the scope of our inventive concept any structure whereby some unit projects beyond the seating extremity of the valve to completely close the valve opening and thereby remove the pressure of the fluid from the valve seat itself.

We claim:

A faucet comprising a fluid chamber having an inlet and an outlet passage, a stepped opening connecting said passages, a valve stem threaded into said chamber and including an extension having a yieldable element secured to the bottom thereof adapted to seat upon the ledge formed by said stepped opening, and means for positioning said yieldable element in relation to said valve stem comprising a headed nut adapted to be threaded into said stem, the head of said nut completely filling the opening formed by the lower step.

In testimony whereof, we, JAMES HIGGINS and JOHN L. SCHULTZ, sign this specification.

JAMES HIGGINS.
JOHN L. SCHULTZ.